United States Patent

[11] 3,608,475

| [72] | Inventors | Douglas R. Scott<br>24 Susquehana Court, Elkhart, Ind. 46514;<br>Kenneth G. Kreuter, 3309 S. Maine,<br>Goshen, Ind. 46526 |
|---|---|---|
| [21] | Appl. No. | 25,026 |
| [22] | Filed | Apr. 2, 1970 |
| [45] | Patented | Sept. 28, 1971 |

[54] APPARATUS FOR CONTINUOUSLY COOKING A PRODUCT
8 Claims, 2 Drawing Figs.

[52] U.S. Cl. .................................................. 99/362
[51] Int. Cl. .................................................. A23b 3/00
[50] Field of Search .................................................. 99/362,
249, 359–360, 361, 363–364, 365–366, 367–368,
371, 443 R, 443 C

[56] References Cited
UNITED STATES PATENTS

| 1,331,066 | 2/1920 | Hopper | 99/371 X |
| 1,576,421 | 3/1926 | Fooks | 99/362 |
| 1,681,101 | 8/1928 | Coyle | 99/359 UX |
| 1,987,414 | 1/1935 | Omsted | 99/362 |
| 2,475,523 | 7/1949 | Schroeder | 99/362 X |
| 2,556,385 | 6/1951 | Allan | 99/362 X |
| 2,569,645 | 10/1951 | Viall | 99/361 UX |
| 3,270,662 | 9/1966 | Flodin et al. | 99/443 R X |
| 3,316,833 | 5/1967 | Williams et al. | 99/443 R X |
| 3,407,721 | 10/1968 | Carvallo | 99/249 |
| 3,511,168 | 5/1970 | Pech | 99/360 |

*Primary Examiner*—Walter A. Scheel
*Assistant Examiner*—Arthur O. Henderson
*Attorney*—Douglas R. Scott

ABSTRACT: Apparatus for continuously cooking a product whereby the product is introduced into a pressurized chamber containing a heated liquid and its vapor, then moved sequentially first through the liquid, second through the vapor, and thence out of the chamber, with sealing means being provided for preventing the escape of the liquid or its vapor.

PATENTED SEP 28 1971　　　　　　　　　　　　　　　3,608,475

INVENTORS
KENNETH G. KREUTER
DOUGLAS R. SCOTT

APPARATUS FOR CONTINUOUSLY COOKING A PRODUCT

It has been common practice to cook food products, such as chicken and the like, by immersing them in a pressurized, heated liquid such as cooking oil. This has been accomplished by providing a tank equipped with a closure and containing heated oil. In prior art devices, the food product was lowered into the oil, the tank sealed with the closure, and heat was added to the oil to raise the temperature and increase the pressure in the tank. At the end of the cooking period, the vapors in the tank were vented to lower the pressure, the closure was removed, and the food was raised from the oil and permitted to drain. Manipulation of the closure, raising and lowering the temperature and pressure, and draining the cooked product were necessarily time consuming. In addition, an elaborate mechanism for handling vented vapors had to be maintained.

An object of this invention is to continuously cook products in heated pressurized liquid without the necessity of periodically raising and lowering the temperature and pressure of the liquid, nor periodically venting the chamber containing the liquid.

Another object of this invention is to cook products by moving them into and out of a chamber containing a heated liquid and its vapor while maintaining a positive pressure within the chamber.

Another object of this invention is to maintain a pressure-tight seal between a cooking chamber structure and transport means for conveying products therethrough.

Another object of this invention is to cook a product by introducing the product into a pressurized chamber containing a heated liquid and its vapor, moving the product sequentially through the liquid, the vapor and thence out of the chamber while preventing escape of the liquid or the vapor from the chamber.

Other objects, uses and advantages of this invention will be apparent from the following description, which proceeds with reference to the accompanying drawings wherein.

Figure 1:
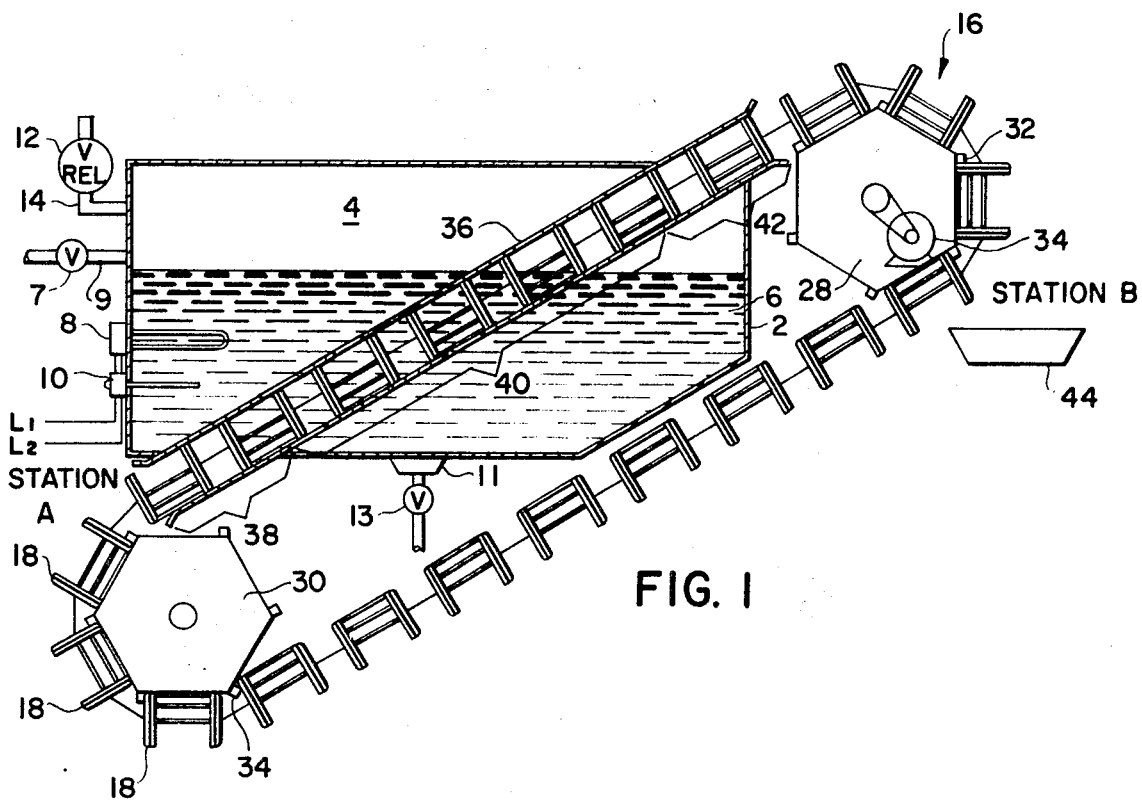
FIG. 1 is a cross-sectional schematic view illustrating one embodiment of this invention.

Referring to FIG. 1, the cooking apparatus includes a tank 2 defining an enclosed pressure-tight chamber 4 adapted to contain a liquid 6 in the lower portion thereof while trapping the liquid's vapor in the upper portion. An electrical immersion heating element 8 carried by the tank 2 extends into chamber 4, contacting the liquid 6 for heating the same, and a suitable thermostat 10 controls the operation of the heating element 8 to maintain the liquid 6 at a preselected temperature. It will be apparent that the pressure within the sealed chamber 4 will be maintained at a discreet level by maintaining a temperature of the liquid 6 at a selected level with the pressure level being determined by the temperature of the liquid and the vapor pressure thereof. However, a pressure relief valve 12 is provided and is connected to the chamber 4 through a conduit 14 for relieving pressure in the chamber 4 should an undesirable pressure rise occur due to failure of thermostat 10 or contamination of the liquid 6 by fluids having relatively high vapor pressures.

The liquid 6 may be introduced to chamber 4 through a valve 7 and conduit 9 and drained from the chamber 4 through a conduit 11 and valve 13.

Transport means in the form of a continuous conveyor 16 is provided for moving the product to be cooked into and out of the chamber 4 while maintaining the pressurized condition of the chamber with the path of the product passing first through the zone containing the heated liquid 6 and then through the zone containing the liquid's vapor.

Figure 2:
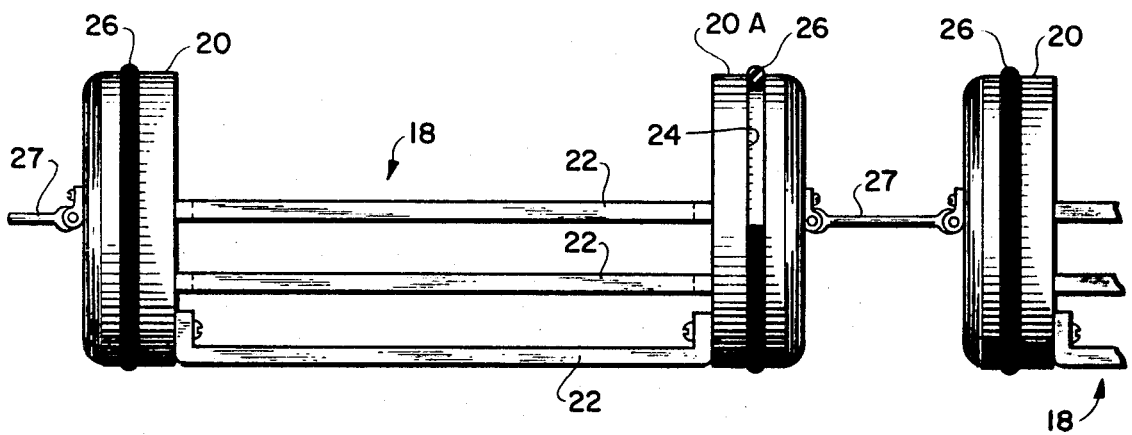
FIG. 2 is a fragmentary, enlarged view of transport means for conveying products to be cooked.

As shown in FIG. 2, the continuous conveyor 16 is made up of the plurality of containers 18 with each container comprising a pair of spaced, circular, imperforate endplates 20 and 20A. The endplates 20 and 20A of each container are maintained in spaced, juxtaposed relation to each other by plurality of elongated spacers 22 attached by any suitable means to plates 20 and 20A. The spacers 22 are secured to the circular plates 20 and 20A adjacent the periphery thereof and in spaced relation to each other to define a rack or basket in which the product to be cooked may be deposited.

The periphery of each of the endplates 20 and 20A is provided with an annular groove 24 adapted to receive an O-ring 26. Adjacent containers 18 are connected to each other by articulated links 27 to form an endless chain which engages peripheries of a pair of drums 28–30. Lugs, 32, on the periphery of the drum 28 engage the containers 18 to move them through a selected path when the drum 28 is rotated by a motor 34. Similar lugs 34 on the periphery of the drum 30 are engaged by the containers 18 to rotate the drum 30 and direct the containers into the open end of a cylindrical conduit 36.

The conduit 36 extends into the bottom of the tank 2, upwardly through chamber 4, and out the top of the tank 2 and is secured in fluidtight relation to the tank wall at points of entrance and exit as by welding or like. The conduit 36 includes a first imperforate sealing portion 38 at the bottom of the tank 2, a medial perforate portion 40 within chamber 4, and a second imperforate sealing portion 42 at the top of tank 2. The drums 28 and 30 are arranged to move the containers 18 through the conduit 36 and the internal diameters of the sealing portions 38–42 are sized to cooperate with the O-rings 26 and circular endplates 20, 20A to effect a fluidtight seal therebetween. Spacing of the containers 18 from each other and the axial length of the sealing portions 38 and 42 are selected so that at least one O-ring 26 is effecting the sealing function in the first sealing portion 38 and in the second sealing portion 42 at all times so that pressure in chamber 4 is maintained as the containers 18 move therethrough.

In operation, the product, such as chicken or the like, is deposited in one of the containers 18 of the conveyor 16 at station A. The container containing the product is drawn into the imperforate sealing section 38 of the conduit 36 with the O-ring 26 carried by the container 18 engaging the inner wall of the sealing portion 38 to form a fluidtight seal. As the container 18 containing the product moves through the sealing portion 38, the second O-ring 26 carried thereby enters the sealing portion 38 to form a fluidtight seal before the first O-ring 26 leaves the imperforate portion 38 and enters the perforate portion 40 of conduit 36; thus a seal will be maintained as the first O-ring carried by the container carrying the product moves into the imperforate portion 40. When the container 18 carrying the product enters the perforate portion 40 of the conduit 36, it and the product contained therein are engulfed by the heated liquid 6 and the product is cooked as it is moved through the liquid 6. As the container 18 containing the product moves upward through the perforate portion 40 of conduit 36 it raises the product out of the liquid 6 permitting excess liquid to drain from the product and return to the lower portion of chamber 4. Further movement of the container 18 containing the product carries the same into and through the imperforate sealing portion 42 with the O-rings 26 carried thereby engaging the inner wall of the imperforate portion 42 in the same manner they engaged the inner wall of the imperforate sealing portion 38 to maintain a fluidtight seal between chamber 4 and the atmosphere while other containers passing through the imperforate sealing portion 38 maintain a seal at the lower end. As the container 18 containing the product immerges from conduit 36, it engages the drum 28 and is carried to unloading station B where the container 18 is inverted and the product falls into a suitable receptacle 44.

The pattern of travel of each container 18 is identical and it will be apparent that the apparatus will provide for uniformity of finished product while eliminating the necessity for periodically raising and lowering the temperature of the cooking liquid and providing for regular blow down of the cooking liquid's vapor.

While the invention has been described in connection with specific embodiment thereof, it will be understood that it is capable of further modification, and this application is intended to cover any variations, uses, or adaptations of the invention following, in general, the principles of the invention and including such departures from the present disclosure as come within know or customary practice of the art to which the invention pertains and as may be applied to the essential features hereinbefore set forth, and as fall within the scope of the invention or the limits of the appended claims.

Having thus described the invention, we claim:

1. Apparatus for continuously cooking products comprising tank means defining a pressurized chamber including a first zone for containing a heated liquid and a second zone for containing the liquid's vapor, transport means for carrying a product sequentially into said chamber, through said first zone, said second zone, and out of said chamber, and sealing means cooperable with said tank means and said transport means for maintaining a positive pressure in said chamber.

2. Apparatus as claimed in claim 1 wherein said transport means includes a plurality of containers.

3. Apparatus as claimed in claim 2 wherein said sealing means comprises annular sealing elements for effecting a seal between said tank means and said containers.

4. Apparatus as claimed in claim 3 wherein said sealing means includes an annular sealing element carried by each of said containers.

5. Apparatus as claimed in claim 4 wherein said tank means includes a cylindrical inlet and a cylindrical outlet cooperable with said sealing means.

6. Apparatus as claimed in claim 5 wherein said transport means and said tank means are constructed and arranged to maintain at least one of said sealing elements in said inlet and at least one of said sealing elements in said outlet at all times.

7. Apparatus for continuously cooking products comprising tank means defining an enclosed chamber, means for heating a liquid in the lower portion of said chamber, means for introducing the product into the lower portion of said chamber while preventing escape of liquid therefrom, and means for removing the product from upper portion of said chamber while preventing the release of vapor pressure therefrom.

8. Apparatus as claimed in claim 7 comprising tubular means extending into said lower portion of said chamber, a plurality of containers for transporting the product through said tubular means, and annular sealing means cooperable with said tubular means and said containers for preventing fluid flow therebetween.